United States Patent [19]
Coleman et al.

[11] Patent Number: 5,976,590
[45] Date of Patent: Nov. 2, 1999

[54] SCREAMING ROCKET

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 09/096,479

[22] Filed: Jun. 12, 1998

[51] Int. Cl.6 .................................................... A23G 3/00
[52] U.S. Cl. ........................... 426/134; 446/81; 446/231; 446/386; 446/487
[58] Field of Search .................... 426/90, 91, 104, 426/134, 421; 446/71, 69, 72, 73, 77, 202, 203, 231, 204, 81, 386, 473, 487

[56] References Cited

U.S. PATENT DOCUMENTS

| | | | |
|---|---|---|---|
| D. 185,235 | 5/1959 | Raffaelli | D17/10 |
| 2,256,925 | 9/1941 | McCoy | 446/202 |
| 2,617,324 | 11/1952 | Brody | 426/104 |
| 2,855,312 | 10/1958 | Kielsmeier | 426/134 |
| 3,037,320 | 6/1962 | Powell | 446/473 |
| 3,077,876 | 2/1963 | Richter | 446/231 |
| 3,088,643 | 5/1963 | Dunn | 426/134 |
| 4,038,776 | 8/1977 | Filipeli | 446/52 |
| 5,209,692 | 5/1993 | Coleman et al. | 446/71 |
| 5,209,694 | 5/1993 | Utt, Jr. | 446/73 |
| 5,391,107 | 2/1995 | Coleman et al. | 446/484 |

*Primary Examiner*—David Lacey
*Assistant Examiner*—Sherry A. Daverman
*Attorney, Agent, or Firm*—Melvin L Crane

[57] ABSTRACT

A screaming rocket pop which includes at least one inner telescoping housing within an outer housing. A lollipop can be secured to the at least one inner housing for consumption by a user. The at least one inner housing may have a lollipop stick retaining device extending from an upper end into the housing for securing the lollipop stick. The device includes a noisemaker therein which can be activated by blowing air through the housing.

11 Claims, 1 Drawing Sheet

SCREAMING ROCKET

This invention is directed to a screaming rocket pop and more particularly to a candy toy holding device and noisemaker to provide amusement for young or old while providing a treat.

BACKGROUND OF THE INVENTION

Heretofore toys have been provided for children which include a pop which is held by various means and also for amusing devices for making a noise.

SUMMARY AND OBJECTS OF THE INVENTION

The screaming rocket pop includes a plastic handle which can be made of one or more telescoping sections. A lollipop is secured to the upper end and a noisemaker is secured within the housing so that one can use the device not only for consumption of the lollipop, but for making a noise. A noisemaker such as a whistle, siren, quacker, or reed-type sounding device can be used.

It is therefore an object to provide a device which includes a lollipop for consumption and a noisemaker for making a noise.

Another object is to provide a candy/toy holding device which can be made with one or more sections of a housing which can be a single piece housing or two or more telescoping pieces.

Still another object is to fix a noisemaker in the housing so that by blowing air through the housing, the noise can be made.

Yet another object is to provide a telescoping toy which can be extending while blowing into the device for simultaneously making a noise during extending the housing.

Other objects and advantages of the invention will become obvious to those skilled in the art upon a review of the specification and drawings.

DESCRIPTION OF THE DEVICE

Figure 2:
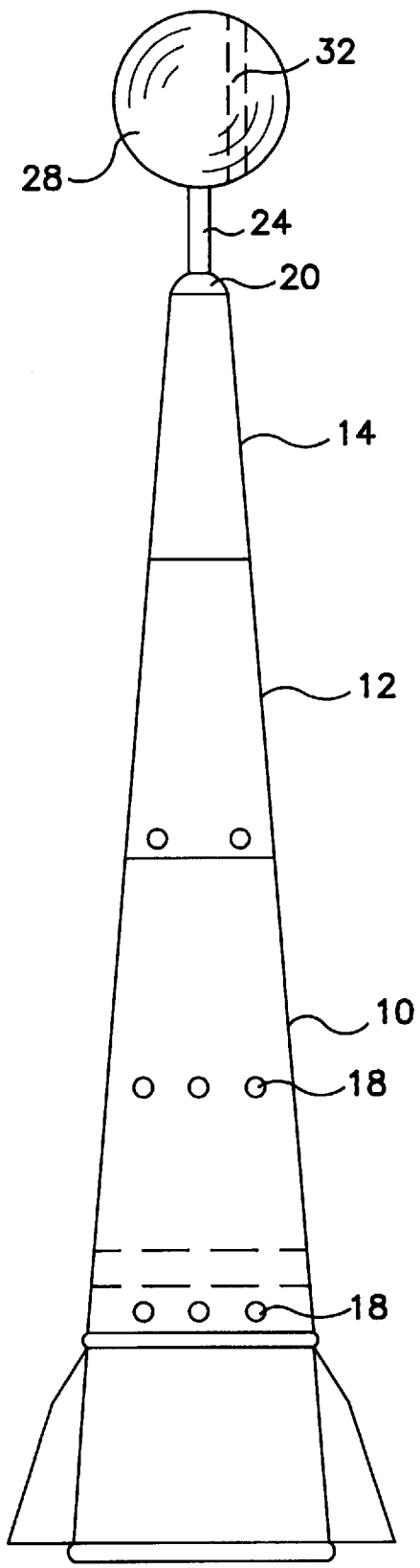
FIG. 2 illustrates a device in a telescoping position.
Figure 1:
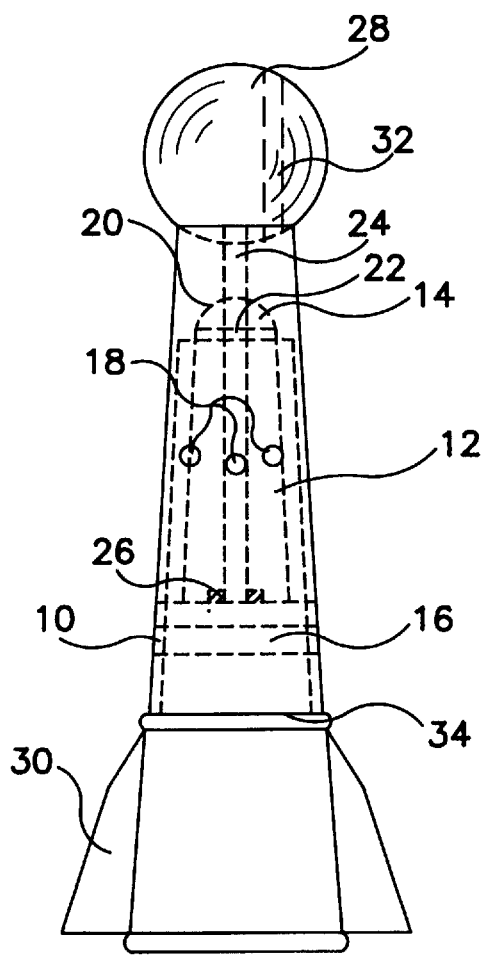
FIG. 1 illustrates a side view of the device in a non-telescoping position.
Figure 3:
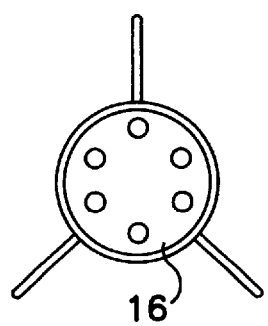
FIG. 3 illustrates an upper end surface of a noisemaker.

Now referring to the drawings wherein the same elements of the device have the same reference characters of the different views, there is shown in FIG. 1 a device which is in a non-telescoping position and as shown, the device includes three different housing sections 10, 12, 14, two (12, 14) of which are contained within the third section and which telescope from the third or outer section. Each of the sections are slightly conical and the upper ends of sections 10 and 12 are provided with a slight protruding shoulder or some means to hook the bottom adjacent end of the inner telescoping piece to prevent the piece from being pulled from the assembly. A noisemaker 16 extends into and is fixed in the bottom of the outermost lower piece 10 and the piece 10 is provided with apertures 18 through which air passes from the noisemaker when a noise is being made.

The innermost housing part 14 is provided with a closed upper end 20 which is provided with an axial aperture 22 through which a lollipop stick holder 24 passes to be secured in place on the device. The bottom of the inner housing part 14 is provided with a lollipop stick holder 26 which supports the end of the lollipop stick when assembled on the housing. The stick holder 26 could be fixed at some other point along the length of the innermost housing part in order to secure the lollipop stick in place on the device. The lollipop stick should have a tight fit so that the telescoping housing parts can be pulled out to a telescoped position.

In assembly of the device, the telescoping sections are assembled in a non-telescoping position. For providing an extra lollipop, a lollipop without a stick could be made to be secured to the upper end of the outer housing. One or more extra lollipops on a stick would be provided for use with the device after the fixed lollipop 28 has been consumed. The fixed lollipop need not be provided; then a lollipop on a stick would be secured in place in the aperture 22. If the lollipop with a stick is secured in the aperture 22, then one could blow hard into the bottom of the main housing and the telescoping housing parts would be pushed out while a noise is being made. This would provide some excitement while making a noise.

It is known that noisemakers can be made which make a noise with air being blown from either direction. It would be obvious that a two-way noisemaker could be fixed in the bottom of the housing and air could be blown from the upper end as well as from the lower end. With a lollipop fixed to the upper end of the housing or with a lollipop on a stick secured in the aperture, air is blown from the bottom of the housing to make a noise. If the lollipop on a stick is in place, blowing on the bottom end would make a noise and could force the sleeves to a telescoped position. One could provide a lollipop with apertures 32 in a direction of the housings and air could be blown through the lollipop in order to make a noise. Likewise, if a lollipop on a stick is in place, the lollipop could have an aperture therethrough toward the housing axis and a noise could be made and the housings could be made to telescope.

In order to provide additional visual effects and to provide a support for positioning the device in an upright position, fins 30 have been provided and attached to the bottom or outer housing 10. If one does not desire to have the extra fins on the device, the fins could be made on a separate holder 34 and the housing could be positioned on the holder for positioning the device in an upright position. With a separate holder the connection between the bottom housing and the fin holder should be a little tight in order to hold the device in place on the holder.

The housing sections should be made of a lightweight material such as plastic and made without any sharp corners or surfaces by which one could get injured. Also, the housing sections could be of the same or different solid colors or with any design of any objects, etc. painted or applied to the surfaces.

Any type of noisemaker can be used so long as it is activated by blowing air into the housing. With a sucker in place, air is blown through the bottom of the outer housing to make a noise as set forth above; if the air is blown hard enough, the parts will telescope. If the noisemaker is adapted for two-way operation, air could be blown from above in order to make a noise.

The foregoing relates to preferred exemplary embodiments of the invention, it being understood that other variants and embodiments thereof are possible within the spirit and scope of the invention, the latter being defined by the appended claims.

We claim:

1. A screaming rocket lollipop which includes
an outer elongated housing,
at least one inner elongated housing with at least a portion thereof contained within said outer elongated housing and adapted to be telescoped relative to said outer elongated housing,
a lollipop secured to an upper end of an innermost of said at least one inner elongated housing, and
a noisemaker in said outer elongated housing.

2. A screaming rocket lollipop which includes
an outer elongated housing,
at least one inner elongated housing with at least a portion thereof contained within said outer elongated housing and adapted to be telescoped relative to said outer elongated housing,
a lollipop secured to a lollipop stick;
one of said at least one inner elongated housing having an aperture in which said lollipop stick passes, and
a lollipop stick securing device in said one of said at least one inner elongated housing and said lollipop stick secured to said lollipop stick securing device.

3. A screaming rocket lollipop as set forth in claim 2, in which said lollipop has a through aperture directed toward a linear axis of any of said at least one elongated housing.

4. A screaming rocket lollipop which comprises:
a first elongated housing having an upper end and a lower end,
a second elongated housing movable within said first elongated housing,
said second elongated housing having an upper end and a lower end,
said second elongated housing positioned so as to be telescoped within said first housing with said lower end of said second housing prevented from movement out of said upper end of said first housing,
a third elongated housing having an upper end and a lower end,
said third housing positioned so as to be telescoped within said second housing with said lower end of said first housing prevented from movement out of said upper end of said second housing, a lollipop secured to a lollipop stick,
said upper end of said third housing having an axial aperture for receipt of said lollipop stick,
a lollipop stick securing means fixed along a linear axis of said first housing, said lollipop stick secured to said lollipop stick securing means, and
a noisemaker fixed in said lower end of said first housing.

5. A screaming rocket lollipop as set forth in claim 4, in which said first housing is of a length by which said second and third housings are contained within said first housing.

6. A screaming rocket lollipop as set forth in claim 5, in which said lollipop stick of said lollipop is secured within said aperture of said third housing.

7. A screaming rocket lollipop as set forth in claim 6, in which said lollipop stick is held within said third housing by use of said lollipop stick securing means.

8. A screaming rocket lollipop as set forth in claim 5, in which said lollipop includes at least one through aperture directed toward a linear axis of said third housing.

9. A screaming rocket lollipop as set forth in claim 5, in which said lollipop seats on said upper end of said first housing when said second and third housings are contained within said first housing.

10. A screaming rocket lollipop as set forth in claim 9, in which said lollipop has an aperture directed toward a linear axis of said first housing.

11. A screaming rocket lollipop as set forth in claim 10, in which said first housing is provided with air escape apertures through which air passes when said noisemaker is activated by blowing air through said first housing.

* * * * *